May 5, 1925.
J. REITZ ET AL
TIRE BUFFING MACHINE
Filed Dec. 11, 1923
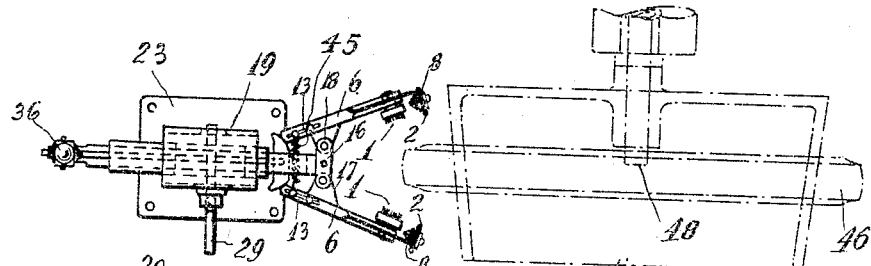
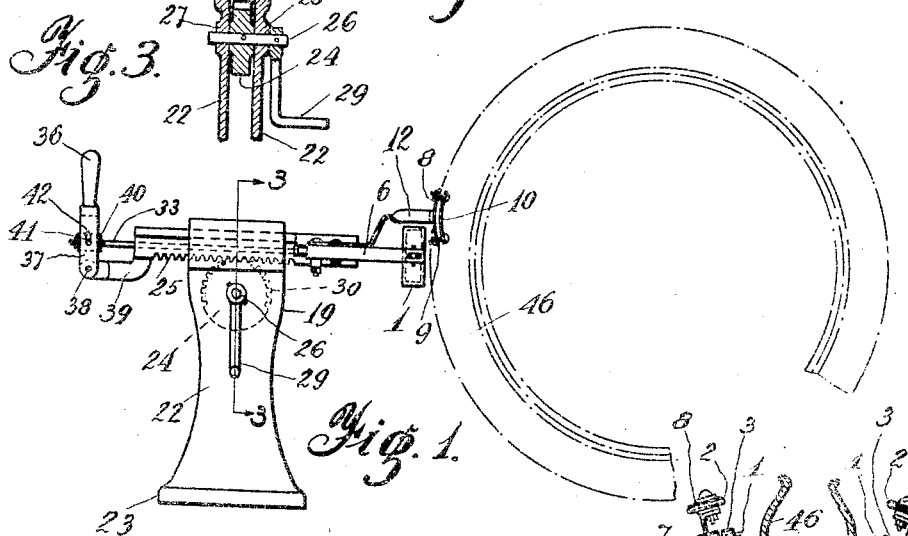
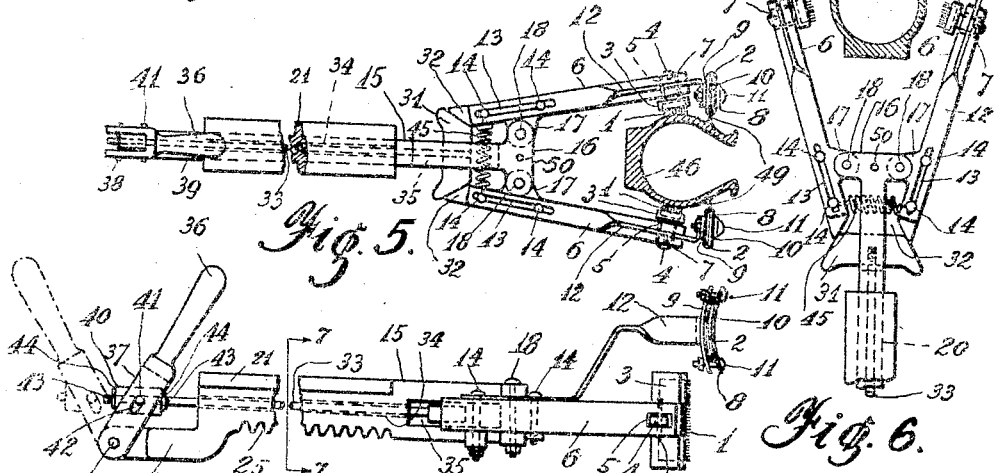
INVENTORS
Joseph Reitz
Frederic Tregesser Jr.
Ralph Dauth and
Paul Purchard
Attorneys.

Patented May 5, 1925.

1,536,928

UNITED STATES PATENT OFFICE.

JOSEPH REITZ AND FREDERIC TREGESSER, JR., OF JEANNETTE, PENNSYLVANIA.

TIRE-BUFFING MACHINE.

Application filed December 11, 1923. Serial No. 679,964.

*To all whom it may concern:*

Be it known that JOSEPH REITZ and FREDERIC TREGESSER, Jr., both citizens of the United States, residing at Jeannette, in the county of Westmoreland and State of Pennsylvania, have invented certain new and useful Improvements in Tire-Buffing Machines, of which the following is a specification.

This invention relates to buffing machines and more in particular to machines for buffing rubber tires used on automobiles and other vehicles.

One of the main objects of this invention is to provide a tire buffing machine which is of simple construction and operation and which can be used on all commercial sizes of automobile tires. Another object is to devise such a machine which will buff both sides of a tire simultaneously, thereby greatly reducing the time required for this operation. A further object is to provide a buffing machine of this character permitting greater and more uniform pressure to be exerted against the tires than is possible by the hand method of buffing now in use. Still a further object is to devise such a machine which has all the ruggedness required for such service and yet is of sufficiently light weight to be moved about by the operator's own strength. Additional features and advantages of this invention will appear from the following description considered in connection with the accompanying drawing forming part of this application.

Referring to the drawings:

Fig. 1 is a side elevation of the machine, shown in position to operate on a tire.

Fig. 2 is a top view corresponding to Fig. 1.

Fig. 3 is a partial cross-section taken on line 3—3 in Figure 1.

Fig. 4 is an enlarged view of a part of the tire buffing machine.

Fig. 5 is a top plan view corresponding to Fig. 4, showing the machine in engagement with a tire.

Fig. 6 is a fractional top plan view showing the machine in its inoperative position relative to a tire.

Fig. 7 is a cross-sectional view taken substantially on line 7—7 in Figure 4.

Reference being had to the drawings, the buffing machine comprises a pair of interchangeable buffing brushes 1, having very stiff bristles preferably made of metal, and a pair of finishing-pads 2 made of folded abrasive cloth, or sand paper. Each of said brushes is preferably mounted and suitably secured to permit renewal in a brush-holder 3 having a depending lug 4 by means of which it is mounted in an aperture 5 provided in an arm 6 and rockably secured therein by a removable pin or bolt 7. Each finishing-pad is removably secured in a pad-holder 8 composed of two arcuate clamping plates 9 and 10 held together by bolts 11. The inner clamping plate 9 is secured in any desired manner to a support 12 made of suitably shaped strap metal having a longitudinal slot 13 and secured for longitudinal sliding movement on the arm 6 by means of bolts 14. Said arms 6 are hingedly and symmetrically mounted on a rack-member 15 having a T-shaped head 16 properly bifurcated to receive the hinge-lugs 17 formed laterally on the arms. The latter are rockably secured to said head by means of bolts 18. The reason for curving the pads 2 is to give them greater stiffness against buckling and greater contact area.

The rack-member is mounted for reciprocative movement on a stand 19 having at its upper part a finished and T-shaped aperture 20 engaged by the intermediate part of the rack-member which part, for the purpose of affording a good guiding contact, is provided on each side with the flanges 21 properly machined to fit within the opening 20.

The supporting legs 22 of said stand are secured to, or formed integrally with, the base 23 and are sufficiently spaced apart to provide room for a gear 24 meshing with the teeth 25 cut on part of the underside of the rack-member. This gear is fastened upon a shaft 26 supported in bearings 27 and 28 provided in the legs and is rotated by means of a crank 29 secured to the shaft. As shown in Fig. 1, the teeth 30 on the gear 24 occupy only a fraction of the circumference of the latter, corresponding to the length of the toothed part of the rack-member; the blank portion of the gear acting as a limiting stop for the reciprocating movements of the rack-member.

The brushes and finishing-pads are brought into contact with the sides of the tire to be buffed by means of the following hand operated mechanism: A double wedge-member 31 is forced against the correspondingly beveled ends 32 of the arms 6 by means of a rod 33 passing through an aperture 34 formed longitudinally in the body of the rack-member, in which a slot 35 has also been provided to receive said wedge-member. The rod is manually operated by the lever 36 the lower part 37 of which is bifurcated and rockably connected by a hinge-pin 38 to a bracket 39 depending from the rear end of the rack-member and made integral therewith, preferably.

The connection between the rod and the lever is effected by means of a sleeve-member 40 placed within the bifurcation of the lever and having lateral pins 41 secured on each side thereof and engaging guide slots 42 provided in each side of said lever. The rod is securely held in the sleeve-member in any desired manner, such as by the pins and washers 43 and 44, respectively. It will be noted that this construction provides for all the variations of the relative angular position between the rod and the lever.

The arms are normally held into open, or inoperative, position by means of a spring 45 positioned intermediate the lugs 17 and the beveled ends 32 and having each of its ends secured to one arm 6.

Having described in detail the essential parts of this tire buffing machine, its mode of operation may now be gone into and will be readily understood.

As is well known, a tire upon removal from its mold is covered outwardly with scales, asperities and a great amount of thin webs, or fins, which occur at places where the various component parts of the mold are joined together. The appearance of a tire, as taken from its mold, is therefore not pleasing and it becomes necessary to remove all the above blemishes in order to obtain a presentable commercial article. Heretofore, when a tire 46 had to be buffed, it was first driven on a slightly conical drum, or mandrel, 47 mounted on a shaft 48 which would be rotated by any suitable mechanism. The operator would then hold a suitable buffing-brush in the palm of his hand and press heavily against one side of the revolving tire, being assisted therein by practically the whole weight of his body. The operation was not only extremely fatiguing, but also quite unhealthy owing to the dust produced by the scales and the abrasive material. Moreover, the heat generated by the friction of the brushes and finishing pads would force the operator to interrupt his work quite frequently, until his brushes or abrasive pads had cooled down. For these reasons it became very hard to get men to work steadily in the buffing room of a tire factory and the labor turn-over would, of course, cause appreciable losses to the employers.

With the machine which forms the object of this application, the abovementioned objections pertaining to the buffing operation by hand are not only overcome, but the production is more than doubled due to the fact that both sides of a tire are buffed at the same time and that no delays due to fatigue, dust, etc., are encountered.

The buffing machine is suitably placed in front of the tire to be buffed and the brushes are brought within reach of the tire by operating the crank 29. The abrasive pads are also adjusted, by means of the bolts 14, to engage the fins 49, which occur always at the same places on tires made from the same or identical molds. The tire is now revolved and the brushes and abrasive-pads are brought to bear against the tire by turning the lever 36 forward, thus driving the wedge 31 against the beveled portions 32 of the arms 6.

It will thus be seen that, by properly manipulating the crank 29 and the lever 36, both sides of a tire can be completely buffed in the same time that would be required to buff one side only.

There has also been shown in the drawing an aperture 50 placed substantially at the middle of the T-head of the rack-member; the purpose of this aperture is to permit the insertion and securing of a third buffing-brush, similar to the ones described, when it is desired to buff the tread portion of a tire. This additional brush is especially valuable for buffing tires having a smooth tread. When so provided, the buffing machine will enable the buffing operation to be performed on the three exposed sides of a tire at substantially the same time and at the same setting.

It will be understood, of course, that the arrangements we have herein shown are merely suggestive of many that might be adopted in carrying out this invention, and we do not wish to be limited to the construction illustrated otherwise than as specified in the appended claims.

What we claim is:—

1. In a buffing machine of the character described, a standard; a reciprocable member mounted thereon; means to reciprocate said member; a plurality of arms hingedly and symmetrically mounted on said reciprocable member; brush-holders carried by said arms; brushes mounted in said holders; a plurality of finishing pads, supports therefor adjustably mounted upon said arms, and hand operated means for converging said arms.

2. In a buffing machine of the character described, a standard; a reciprocable member mounted thereon; means to reciprocate said member; a plurality of arms hingedly and symmetrically mounted on said reciprocable member; brush-holders rockably mounted on said arms; brushes removably secured in said holders; a plurality of finishing pads removably mounted on supports secured for longitudinal adjustment of said arms, and hand operated means for converging said arms.

3. In a buffing machine of the character described, a standard; a reciprocable member mounted thereon; means to reciprocate said member; a plurality of arms hingedly and symmetrically mounted on said reciprocable member; brush-holders rockably mounted on said arms; brushes removably secured in said holders; a plurality of finishing pads removably mounted on supports secured for longitudinal adjustment on said arms; means to stiffen said pads against buckling, and hand operated means for converging said arms.

4. In a buffing machine of the character described, a standard; a reciprocable member mounted thereon; means to reciprocate said member; a plurality of arms hingedly and symmetrically mounted on said reciprocable member; brush-holders rockably mounted on said arms; brushes removably secured in said holders; a plurality of finishing pads removably mounted on supports secured for longitudinal adjustment on said arms; means to stiffen said pads against buckling; hand operated means for converging said arms, and means for automatically separating said arms.

5. In a buffing machine of the character described, a standard; a reciprocable member mounted thereon; means to reciprocate said member; a plurality of arms hingedly and symmetrically mounted on said reciprocable member; brush-holders rockably mounted on said arms; brushes removably secured in said holders; a plurality of finishing pads removably mounted on supports secured for longitudinal adjustment on said arms; hand operated means for converging said arms, and means for limiting the reciprocal movements of said reciprocable member.

6. In a buffing machine of the character described, a standard; a reciprocable member having a rack mounted thereon; a gear engaging said rack, said gear having stops to limit the movements of said reciprocable member; means to rotate said gear manually; a plurality of arms hingedly and symmetrically mounted on said reciprocable member; brush-holders rockably mounted on said arms; brushes removably secured in said holders; a plurality of finishing pads; supports therefor mounted for longitudinal adjustment on said arms, said pads being secured for greater stiffness to said supports by arcuate clamping plates; hand operated means for converging said arms, and resilient means for separating same 7. In a buffing machine of the character described, a standard; a reciprocable member having a rack mounted thereon; a gear engaging said rack, said gear having stops to limit the movements of said reciprocable member; means to rotate said gear manually; a plurality of arms hingedly and symmetrically mounted on said reciprocable member; said arms having inwardly directed converging beveled surfaces provided on their inner extremities; a wedge-member adapted to engage said beveled surfaces; brush holders rockably mounted on said arms; brushes removably secured in said holders; a plurality of finishing-pads; supports therefor mounted for longitudinal adjustment on said arms; said pads being secured for greater stiffness to said supports by arcuate clamping plates; hand operated means for driving said wedge-member between said beveled surfaces, and resilient means for separating said arms automatically.

8. In a buffing machine of the character described, a standard; a reciprocable member having a rack mounted thereon; a gear engaging said rack, said gear having stops to limit the movements of said reciprocable member; means to rotate said gear manually; a plurality of arms hingedly and symmetrically mounted on said reciprocable member; said arms having inwardly directed converging beveled surfaces provided on their inner extremities; a wedge-member adapted to engage said beveled surfaces; brush-holders rockably mounted on said arms; brushes removably secured in said holders; a plurality of finishing-pads; supports therefor mounted for longitudinal adjustment on said arms; said pads being secured for greater stiffness to said supports by arcuate clamping-plates; a hand operated lever mounted for rocking movement upon said reciprocable member; means connecting said lever to said wedge-member positioned substantially within said reciprocable member, and a spring member positioned between said arms for normally separating them.

In testimony whereof they affix their signatures.

JOSEPH REITZ.
FREDERIC TREGESSER, Jr.